Jan. 28, 1936.  R. E. WENDELL ET AL  2,029,043
FLOWER SUPPORT
Original Filed Nov. 15, 1932

INVENTORS
RENÉ E. WENDELL
FRANK HLAVACEK, JR.
BY Stanley Hoods

ATTORNEY.

Patented Jan. 28, 1936

2,029,043

UNITED STATES PATENT OFFICE 2,029,043

FLOWER SUPPORT

René E. Wendell, Wilmette, and Frank Hlavacek, Jr., Evanston, Ill.; said Wendell assignor to said Hlavacek Application November 15, 1932, Serial No. 642,749
Renewed June 25, 1935

5 Claims. (Cl. 47—55)

This invention relates to a flower support, and more particularly to a device of this character designed to reinforce the corolla or petals of a flower.

It is an object of the present invention to provide a support operative to maintain the fresh and natural appearance of flowers having petals lacking normal staying or standing quality.

A further object of this invention resides in the provision of a flower support which may be easily yet firmly attached to the stem or axis of a flower without injury thereto.

It is also an object of this invention to provide a flower support adapted to remain concealed from normal view when in operative association with a flower.

With the above and other objects in view, as will be apparent, this invention consists in the construction, combination and arrangement of features, all as hereinafter described, claimed and illustrated in the accompanying drawing, wherein Fig. 1 is an enlarged elevational view of a flower support constructed in accordance with the preferred embodiment of the present invention.

Figure 1:
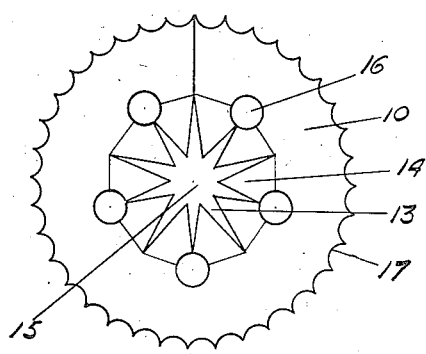

Since every florist has to depend in some degree on disposing of his merchandise in the form of floral arrangements in order to realize a profit despite unavoidable loss in perishable flowers, it is necessary that the sale of cut flowers, corsages and arm bouquets be encouraged. Hence, unless he is able to maintain the fresh and natural appearance of his product for the purpose of floral arrangements, it is a hardship for a florist to employ plants which do not have long-standing properties. In most varieties of flowers the calyx is adapted to support the petals and prevent the drooping thereof. Even flowers made up of relatively heavy and isolated petals obtain their support in this manner. Other varieties, such as gardenias and the like are not possessed of the ordinary staying qualities in that the bloom is not only made up of relatively heavy petals but the position and quality of the calyx in these plants is such that it lends practically no support to the petals. The restoration and most desirable arrangement of flowers such as gardenias and other flowers having relatively limited staying quality, cannot be obtained by the ordinary means of reviving plants that have become flagged in normal handling, but must be artificially braced or supported in order to obtain the desired appearance. Owing to the relatively delicate nature of a flower it is manifestly desirable to provide a flower support which will not injure the plant and yet allows a firm attachment thereof to a flower. It is likewise essential to so construct a device of this character as to render its presence obscured from normal view.

The present invention contemplates a flower support or petal reinforcing element adapted to be firmly attached to the stem of a flower and to cooperate with the under surface of the petals so as to maintain the same in a position rendering the same fresh and natural in appearance.

Reference being had more particularly to the drawing, the flower support embodying the features of this invention comprises a disk, preferably of flexible material, having a relatively flat body portion 10. This disk may be stamped or otherwise formed from celluloid or other suitable material, and the size and shape thereof may be varied in accordance with the size and shape of the flower to be supported thereby. Since it is desirable to have the same concealed from normal view, the disk is preferably of a perimeter smaller than that of the outer limits of the corolla or petals of the flower, so as to allow the outer portion of the flower to extend slightly beyond the limits of the body portion 10 of the disk.

Figure 4:
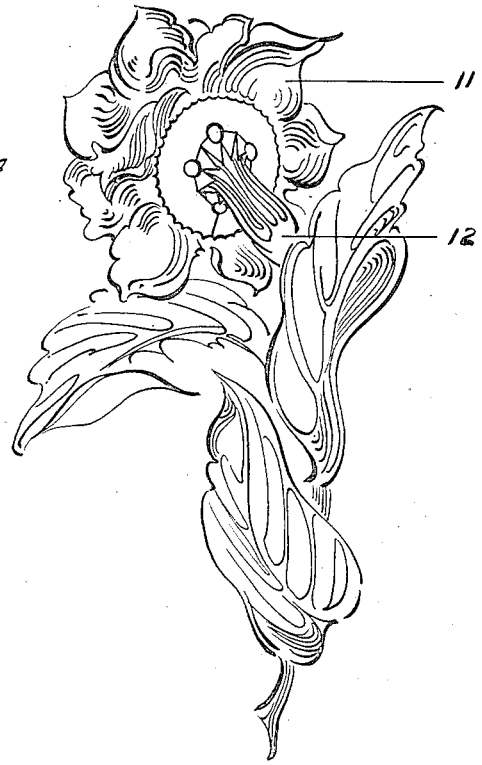
Fig. 4 is a perspective view of the present invention in operative association with a flower.
Figure 2:
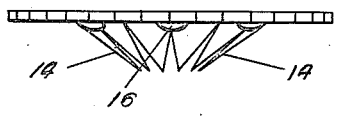
Fig. 2 is a side view of the flower support illustrated in Fig. 1.
Figure 3:
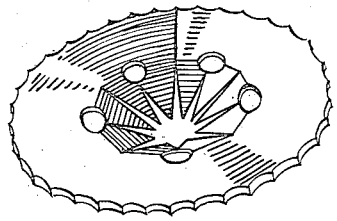
Fig. 3 is a perspective view of the flower support shown in Figs. 1 and 2.

In order to arrange the body portion 10 in a position to bear against and support the petals 11 of a flower in the manner illustrated in Fig. 4, it is essential to provide an opening therein for receiving the stem 12 thereof as well as to provide a seat or receptacle for any enlargement of the stem at the axis of the flower. To this end, radial slots 13 of suitable length are provided in the body portion 10, to divide the inner or central section thereof into any desired number of sector-shaped fingers 14. By deflecting the fingers 14 downwardly from the plane of the body portion 10, the free ends of the fingers 14 separate and define at their ends a central opening 15 adapted to receive the stem 12. It will readily be understood that this arrangement of the fingers 14 will cause the free ends thereof to exert a pressure against the adjoining stem 12 and the upper portions thereof will cooperate to form a seat for the axis of the flower. Owing to the flexible quality of the body portion 10 and the fingers 14, any enlargement of the stem at the axis of the flower is readily accommodated without undue distortion or warping of the support.

In order to prevent slipping or cracking of the body portion 10 at the inner ends of the slots 13 during the manufacture or use thereof, openings 16, preferably of a diameter greater than the width of the slots 13 are provided in communication with the inner ends of alternate slots 13. The efficiency of the flower support embodying this feature is also increased in that the biting edge of or surface defining the juncture of the body portion 10 and the deflected fingers 14 is lengthened and greater resistance to slipping is afforded.

As will be noted in Fig. 1, one of the radial slots 13 is extended to the outer periphery of the body portion 10. Access to the central or stem-receiving opening 15 is thus obtained by merely flexing the body 10 adjacent the extended slot 13. The present support is therefore readily attached to or detached from a flower.

The outer periphery of the body portion 10 of the disk may be plain or formed with serrations 17, as shown in Fig. 1. Manifestly, any suitable design may be employed for this purpose.

It will be apparent from the foregoing that the inherent flexibility of the present device effectively cooperates with the tightening action of the fingers 14 in holding the body portion 10 against the adjacent surface of the petals 11 and in maintaining the petals in an elevated position. At the same time, the flexibility of the fingers 14 will force the support into close engagement with the stem 12 of the flower, thus providing means to prevent accidental slipping of the support on the stem 12 in a direction away from the flower. Owing to the flexible quality of the support it will be apparent that its manipulation and arrangement are sufficiently yieldable to prevent injury to the flower supported thereby.

From the foregoing it will be recognized that the structural characteristics of the flower support contemplated herein renders said support effective to maintain the fresh and natural appearance of flowers whose petals are either normally weak or subject to collapse in handling. Furthermore, the features of construction referred to render the external appearance of the support free from unsightly effect when in operative association with a flower.

The use of a flower support embodying the foregoing features is not limited to a single application but is manifestly adapted for repeated use without impairing its quality. Its resilient properties also render it effective in supporting flowers whose stems or petals vary in size throughout a relatively wide range. Accordingly, the cost of equipment of this character is minimized since a relatively limited supply of flower supports embodying the features of this invention will amply meet the average requirements.

What is claimed is:

1. In a flower support, a petal-reinforcing member having a portion deflected from its face, the walls of said deflected portion being adapted to engage the stem of a flower, and means for increasing the normally effective biting quality of said deflected portion.

2. A flower support comprising a petal-reinforcing member having a portion deflected from its face, the walls of said deflected portion being adapted to engage the stem of a flower, and means for increasing the normal length of the surface defining the juncture of the face and deflected portion.

3. A flower support comprising a body having a relatively flat face, a plurality of fingers formed by radial slots in the central portion of and angularly deflected to the face of said body, and openings of a diameter greater than the width of said slots communicating with the inner ends of predetermined slots.

4. A flower attachment comprising a flexible body adapted to encircle the stem of a flower, a plurality of fingers formed by radial slots in the central portion of and angularly deflected to the face of said body, and openings of a diameter greater than the width of said slots communicating with the inner ends of predetermined slots.

5. A flower attachment comprising a body adapted to encircle the stem of a flower, means formed integrally therewith for preventing movement of said body on the stem in a direction away from the flower comprising a plurality of fingers formed by radial slots in the central portion of and angularly deflected to the face of said body, and openings of a diameter greater than the width of said slots communicating with the inner ends of predetermined slots.

RENÉ E. WENDELL.
FRANK HLAVACEK, Jr.